United States Patent [19]

Raethel et al.

[11] Patent Number: 5,050,796
[45] Date of Patent: Sep. 24, 1991

[54] FUEL PREHEATING DEVICE FOR A HEATER

[75] Inventors: Dieter Raethel, Mittelstetten; Christof Schumacher, Krailling; Wilfried Renovanz, Groebenzell; Bernhard Umlauf, Seefeld, all of Fed. Rep. of Germany

[73] Assignee: Webasto AG Fahrzeugtechnik, Fed. Rep. of Germany

[21] Appl. No.: 487,113

[22] Filed: Mar. 2, 1990

[30] Foreign Application Priority Data

Mar. 30, 1989 [DE] Fed. Rep. of Germany ....... 3910241

[51] Int. Cl.$^5$ ............................................. B60H 1/02
[52] U.S. Cl. ................................. 237/12.3 C; 432/222
[58] Field of Search ..................... 237/12.3 C; 432/222

[56] References Cited

U.S. PATENT DOCUMENTS

| | | | |
|---|---|---|---|
| 2,352,112 | 7/1944 | LaSha et al. | 237/12.3 C |
| 3,400,889 | 9/1968 | Hoyer | 237/12.3 C |
| 3,861,590 | 1/1975 | Kofink | 237/12.3 C |
| 3,995,991 | 12/1976 | Wilkinson | 432/222 |
| 4,105,158 | 8/1978 | Hasebe et al. | 237/12.3 C |
| 4,192,457 | 3/1980 | Easterly | 237/12.3 C |
| 4,385,726 | 5/1983 | Bernauer et al. | 237/12.3 C |
| 4,828,170 | 5/1989 | Takman | 237/12.3 C |
| 4,883,226 | 11/1989 | Tomita et al. | 237/12.3 C |

FOREIGN PATENT DOCUMENTS 2623921 12/1977 Fed. Rep. of Germany .
3308891 9/1984 Fed. Rep. of Germany .
3721834 1/1989 Fed. Rep. of Germany .

Primary Examiner—Henry C. Yuen
Attorney, Agent, or Firm—Sixbey, Friedman, Leedom & Ferguson

[57] ABSTRACT

A heater, in particular a motor vehicle heater operated with liquid fuel in which the fuel to be fed to the burner of the heater is preheated using the thermal energy of the combustion gases in the discharge area of the heater to guarantee reliable operation of the heater even at low temperatures, and to prevent paraffin separations, especially with diesel fuel in advance of filter devices in the fuel supply of the burner. For this purpose, a fuel preheating pipe section is provided that can be made in the form of a spiral-shaped pipe loop and that is placed in the flow of combustion gases, which have passed through the heat exchanger of the heater. Since the fuel is warmed in the fuel flow pipe before passage through the filter device, clogging of the filter device is avoided. In accordance with various embodiments the fuel preheating pipe section can be placed in an exhaust gas collecting chamber of the heater or in an exhaust gas discharge connection. Another embodiment feature includes the provision of a second heat exchanger that warms the fuel to being fed to the internal combustion engine using the liquid coolant that was previously warmed in the motor vehicle heater and which also serves as the heat exchange medium for the heat exchanger of the heater.

20 Claims, 3 Drawing Sheets

FUEL PREHEATING DEVICE FOR A HEATER

BACKGROUND OF THE INVENTION

The invention relates to a fuel preheating device for a heater, in particular a motor vehicle heater, operated with liquid fuel, with a burner that is connected to a fuel flow pipe containing a fuel filter for fuel supply and to a fuel return pipe for removal of excess fuel, and with a heat exchanger for a heat exchange between the hot combustion gases generated during combustion of the fuel supplied and a heat exchange medium flowing through the heat exchanger, and an exhaust gas discharge outlet through which the combustion gases, after passage through the heat exchanger, exit the heater.

From German Offenlegungsschrift 26 23 921 there is known, for example, a motor vehicle heater that is operated with liquid fuel of the type mentioned above. Here, a so-called "air heater" is involved in which a gaseous heat exchange medium, the so-called heating air, is used. Further, with this heater there is provided a heat exchanger for the cooling liquid of an internal combustion engine of a motor vehicle, so that the cooling liquid is warmed by the energy of the hot combustion gases generated in the heater during combustion, and the cooling liquid warmed this way is circulated in the cooling liquid circuit of an internal combustion engine.

Heaters are also known in which the burner has a spray nozzle or diffuser to spray or atomize the fed liquid fuel. To start such a heater, a thermostatically controlled nozzle assembly preheating can be provided that preheats the liquid fuel, such as diesel fuel, in the nozzle assembly of the spray diffuser to assure starting of the heater even at low temperatures at which, for example, the paraffin tends to separate out of diesel fuel.

German Patent No. 33 08 891 discloses a fuel supply device for motor vehicle diesel engines in which an auxiliary heater that can be operated independently of the engine is provided in which the heat exchange medium circuit is connected to a heat exchanger in which the fuel to be fed to the internal combustion engine is preheated.

From German Offenlegungsschrift No. 37 21 834, a fuel preheating device for liquid fuel for heaters is known in which, to achieve trouble-free operation at low temperatures, the fuel is warmed, in a pipe section that runs between a fuel tank and a fuel pump, by a heat-transferring contact of this pipe section with a pipe conveying exhaust gas. Here, the heat exchange takes place in the area of the exhaust gas discharge connection of the heater, around which windings of the fuel pipe section are arranged. In such a design, the installation of the heater and its mounting are made more difficult and, further, here, no long-term, effective heat exchange is assured, since the contact areas tend to become contaminated by spray water and the like.

In all these known heaters, the tendency of paraffin to separate out of the fuel, especially diesel fuel, at low temperatures makes for difficulties, since the danger exists that the separated paraffin will clog filters in the fuel-conveying pipes. Previous fuel preheating devices in such heaters, such as thermostatically controlled nozzle assembly preheating devices, are electrically operated, and this electrical energy must normally be taken from the motor vehicle battery of the motor vehicle, consequently placing a greater load on the battery.

SUMMARY OF THE INVENTION

The invention is based on the object of providing a fuel preheating device of the generic type mentioned above by which fuel preheating is economically achieved with an extensive reduction in the need for a supply of external energy, such as electrical energy from a motor vehicle battery, in particular, to counteract separations of paraffin when a diesel fuel is utilized.

According to the invention, this object is achieved in accordance with preferred embodiments of the invention by providing a fuel preheating device wherein the fuel flow pipe has a fuel preheating pipe section which is disposed in the flow path of the combustion gases flowing through the heat exchanger of the heater as a means for warming the fuel in the fuel flow pipe at a location upstream of the fuel filter in a direction of fuel flow to the burner.

With this design of the fuel preheating device according to the invention, the thermal energy of the combustion gases at the discharge area of the heater is used, after starting of the heater, to warm the liquid fuel, such as diesel fuel, by heat exchange in the area of the fuel flow pipe and before reaching the sensitive filter devices. With this fuel preheating using the exhaust gases of the heater, the consumption of electrical energy for the fuel preheating can ge considerably reduced, resulting in an economically advantageous fuel preheating in a way that exploits the heat of the exhaust gases leaving the heater. For example, in the case of a heater that has a spray burner with a nozzle assembly preheating device, the nozzle preheater needs to be operated by electrical energy only until the heater starts and then it can be shut off since, from then on, the energy of the exhaust gases of the heater is used for fuel preheating, especially to guarantee a trouble-free, continuing operation of the heater in that, also, the filter devices, placed in the fuel flow pipe upstream from the burner, are protected from clogging, such as by deposits of paraffin.

According to a preferred embodiment according to the invention, the fuel preheating pipe section is formed by a spirally-running pipe coil that comprises at least one coil winding. With such a design, there is obtained, in the most compact space possible, as large a heat exchange surface as possible at the fuel preheating pipe section, to achieve an effective heat exchange between the hot combustion gases and the fuel going through the fuel preheating pipe section. The spirally running pipe coil can also comprise several coil windings if, to accommodate such a fuel preheating pipe section, enough space is available or if, because of relatively small winding diameters, several coil windings are necessary to provide a sufficient heat exchange surface.

Preferably, the coiled fuel preheating pipe section is placed around the heat exchanger, and suitably this fuel preheating pipe section lies in an exhaust gas collecting chamber provided upstream from the exhaust gas discharge in the direction of the combustion gas stream. In this area in a heater, there is generally still enough space available to accommodate such a fuel preheating pipe section which, in this area, can be placed so that the combustion gas stream going to the exhaust gas discharge is obstructed as little as possible. In particular, the fuel preheating pipe section can be placed near the outside wall of an exhaust gas collecting chamber, so that it lies in the area of the turbulent region of the combustion gas stream going to the exhaust gas discharge of the heater, simultaneously enabling the prevention of too great a heating of the fuel going through the fuel preheating pipe section, which could lead to an outgassing of the fuel and to a formation of bubbles in the fuel flow pipe and interruptions thus caused in the operation of the heater.

Alternatively, the fuel preheating pipe section of the fuel preheating device can be placed inside a discharge outlet connection for the exhaust gases, or the fuel preheating pipe section can, be embedded in the wall of such a connection.

In all cases, the fuel preheating pipe section is produced from a corrosion-resistant and/or heat-resistant material so that essentially it is not attacked by the combustion gases in the area of the discharge of the heater.

If the fuel preheating device is provided, for example, in a heater that is integrated into a liquid coolant circuit of an internal combustion engine and the coolant liquid acts as a heat exchange medium, according to an advantageous, modified embodiment according to the invention, the design is made so that another heat exchanger is placed in a circuit parallel to the heater. This second heat exchanger enables the fuel fed to the internal combustion engine to also ge preheated. With such a design, the need to use additional, also mostly electrically operated preheating devices for the fuel supply of an internal combustion engine, especially in diesel internal combustion engines, can be avoided, thereby achieving an energy-saving fuel preheating, especially at low temperatures.

Since, as indicated above, the motor vehicle heater can operate reliably even at low temperatures thanks to the fuel preheating device according to the invention with the fuel preheating pipe section of the fuel supply of the heater, with this modified embodiment according to the invention and by integration into a liquid coolant circuit of an internal combustion engine, the warming of the liquid coolant caused by the motor vehicle heater can simultaneously be exploited to preheat the fuel to be fed to the internal combustion engine. Furthermore, the parallel arrangement of this second heat exchanger enables the liquid coolant warmed in the motor vehicle heater to be used as closely as possible to the motor vehicle heater to preheat the fuel to be fed to the internal combustion engine, so that a reliable and quick preheating of the fuel to be fed to the internal combustion engine is achieved. In this way, the starting behavior of an internal combustion engine of a motor vehicle, especially under so-called cold start conditions, can be improved considerably.

To make installation of such a second heat exchanger as simple and as cost effective as possible, a connecting part is utilized which has a feed branch pipe connected to the intake of the second heat exchanger and a return branch pipe connected to the discharge of the second heat exchanger. Such a connecting part can, for example, be used, in a simple way, at the point at which the liquid coolant circuit must be opened, anyway, for installation of the motor vehicle heater, so that no additional installation work is necessary due to use of the connecting part. Advantageously, this connecting part is placed between the coolant discharge outlet of the motor vehicle heater and the return pipe leading to the liquid coolant circuit of the internal combustion engine. The second heat exchanger is placed, in particular, in the area of the fuel flow pipe of the fuel supply device of the motor vehicle internal combustion engine, and specifically, upstream from the sensitive fuel filters of the fuel supply device of the motor vehicle internal combustion engine.

In this embodiment described above according to the invention, with the integration of the motor vehicle heater into the cooling liquid circuit of the internal combustion engine, there is additionally achieved a reliable preheating of the fuel to be fed to the internal combustion engine in the area of the fuel supply device of the latter.

These and further objects, features and advantages of the present invention will become more obvious from the following description when taken in connection with the accompanying drawings which show, for purpose of illustration only, several embodiments in accordance with the present invention.

BRIEF DESCRIPTION OF THE DRAWINGS

In the figures of the drawing, the same or similar parts are provided with the same reference symbols, and with prime (') symbols being used to distinguish between embodiments.

DETAILED DESCRIPTION OF THE PREFERRED EMBODIMENTS

Figure 1:
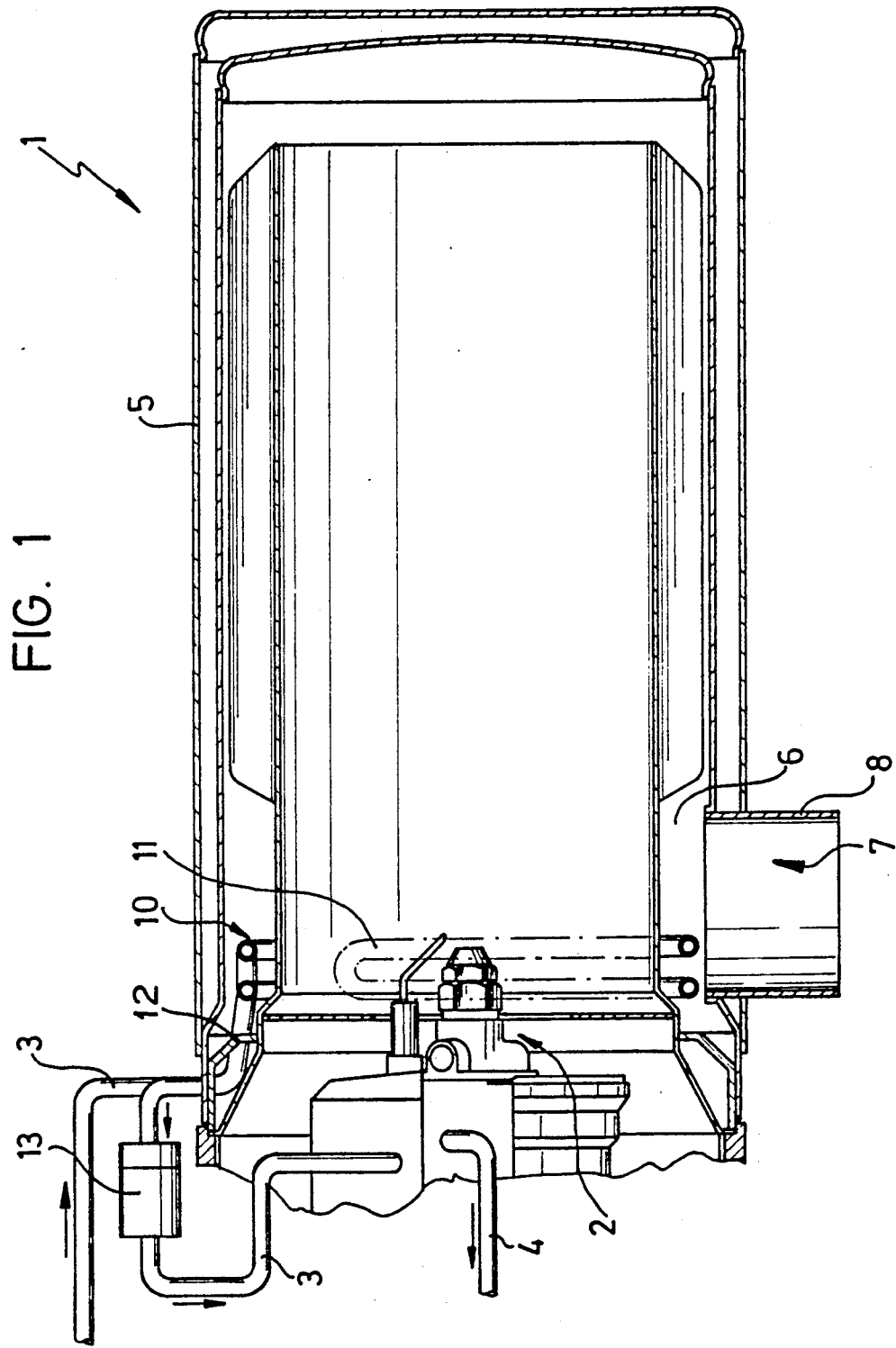
FIG. 1 is a diagrammatic view of a heater with a fuel preheating device in accordance with a preferred embodiment of the invention.

In FIG. 1, a motor vehicle heater is designated overall by numeral 1. Motor vehicle heater 1 has a burner 2, not represented in detail, that is supplied with fuel from a fuel supply, also not represented in detail, by a fuel flow pipe 3. From burner 2, unneeded fuel is returned to the fuel supply by a fuel return pipe 4. Such a motor vehicle heater 1 is operated, for example, with diesel fuel, in which paraffin tends to separate out at low temperatures.

Further, motor vehicle heater 1 has a heat exchanger, designated overall by numeral 5, by which the hot combustion gases generated during combustion of the fuel fed to burner 2 are put in a heat exchange relationship with a heat exchange medium flowing through heat exchanger 5 to deliver heat to the heat exchange medium. After passage through heat exchanger 5, the combustion gases flow, for example, to an exhaust gas collecting chamber 6; and then exit motor vehicle heater 1, from there, by an exhaust gas discharge outlet 7 which, for example, can be in the form of a discharge connection 8. From outlet 7, the exhaust gases are carried away into the environment.

In FIG. 1, a fuel preheating pipe section 10 is shown in the form of a spirally wound pipe loop 11 that is joined at its ends, for example. Pipe loop 11 is placed near an outer gall, designated by 12, of exhaust gas collecting chamber 6 upstream from exhaust gas discharge outlet 7 in the direction of exhaust flow to the outlet 7. This fuel preheating pipe section 10 or pipe loop 11 is connected at its intake side to fuel flow pipe 3 upstream (in a direction of fuel flow to the burner 2) from a filter 13 in fuel flow pipe 3. The discharge side of fuel preheating pipe section 10 also empties back into fuel flog pipe 3 into fuel flow pipe 3 upstream from filter 13.

When motor vehicle heater 1 is in operation, the fuel being fed to burner 2 is branched from fuel flow pipe 3, conveyed through fuel preheating pipe section 10, and the fuel is warmed in this fuel preheating pipe section 10 by the thermal energy of the exhaust gases in the area of exhaust gas collecting chamber 6. The fuel warmed this way is, then, conveyed to burner 2 after passing through filter 13. As a result, burner 2 can always be reliably supplied with sufficient free-flowing fuel, without paraffin separations at low fuel temperatures leading to breakdowns of burner 2. With motor vehicle heater 1, the fuel to be fed to burner 2 is, thus, preheated using the heat of the exhaust gases leaving motor vehicle heater 1, and the otherwise lost exhaust gas heat is exploited economically for fuel preheating.

Figure 2:
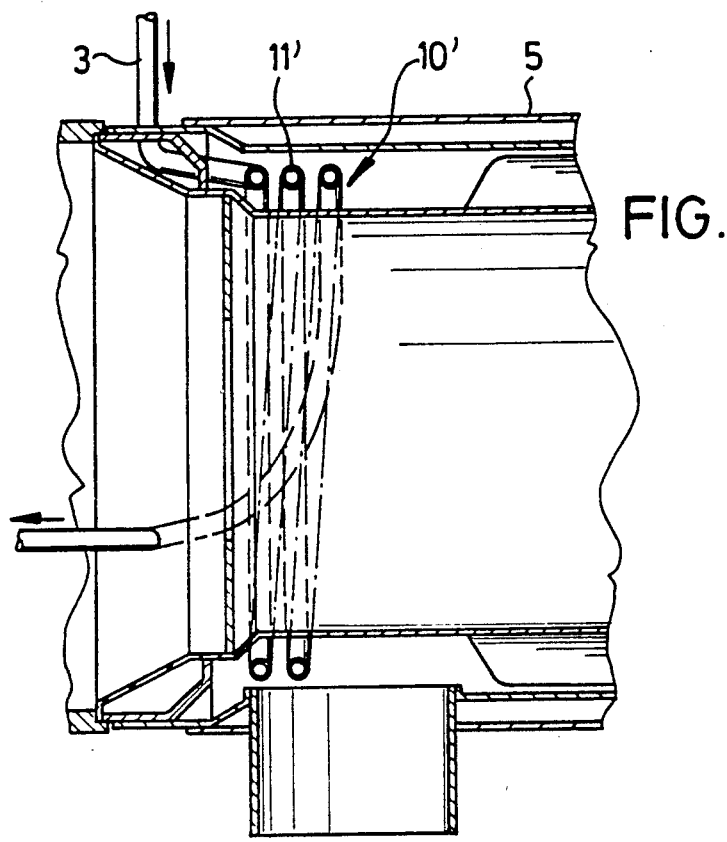
FIG. 2 is a sectional view of a portion of a heater of an embodiment wherein a the fuel preheating pipe section, in the shape of a spirally running pipe coil, is placed in an exhaust gas collecting chamber upstream from the exhaust gas discharge outlet of the heater.

FIG. 2 shows a modified form for the fuel preheating pipe section designated 10'. In this case, a pipe loop 11' is provided which comprises several windings. As an example, here one was chosen such that pipe loop 11' comprises about two and a half windings. Further details of motor vehicle heater 1 are not shown, here, since they coincide with those shown in FIG. 1.

Figure 3:
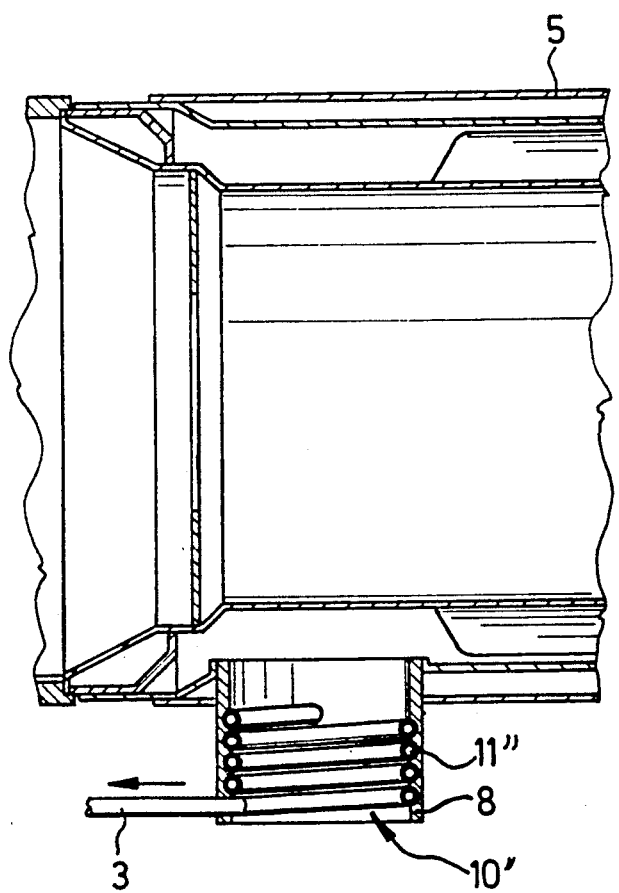
FIG. 3 is a similar view to that of FIG. 2, but of a modified embodiment in which the fuel preheating pipe section is placed in the discharge outlet connection of the heater.

In the embodiment according to FIG. 3, a fuel preheating pipe section 10" comprises a pipe loop 11" which, in the example represented there, also comprises several windings. Fuel preheating pipe section 10" is placed, unlike the previous embodiments, in the discharge connection 8 forming the exhaust gas discharge outlet of motor vehicle heater 1. So as not appreciably to reduce the exhaust gas passage cross section in discharge connection 8, fuel preheating pipe section 10" is, advantageously, integrated into the inside wall of discharge connection 8. Although not illustrated, fuel preheating pipe section 10" could, also, be placed in completely within the wall of discharge connection 8 instead of only being partially embedded in its inner wall surface, as shown.

Fuel preheating pipe section 10, 10', 10" is thus always placed and designed so that, on the one hand, an effective and rapid warming of the fuel for the heater is achieved, but on the other hand so that an overheating of the fuel in fuel preheating pipe section 10, 10', 10" is avoided. With this embodiment, the fuel can be warmed to its surge limit to achieve, even at low temperatures, a reliable operation of motor vehicle heater 1, 1'.

Further, a design is possible wherein the fuel preheating pipe section 10 or 10' is placed, for example, in the area of the discharge end of heat exchanger 5. But with such a design, it would have to be taken into consideration that an unimpeded flow of the hot combustion gases through heat exchanger 5 must be assured.

Figure 4:
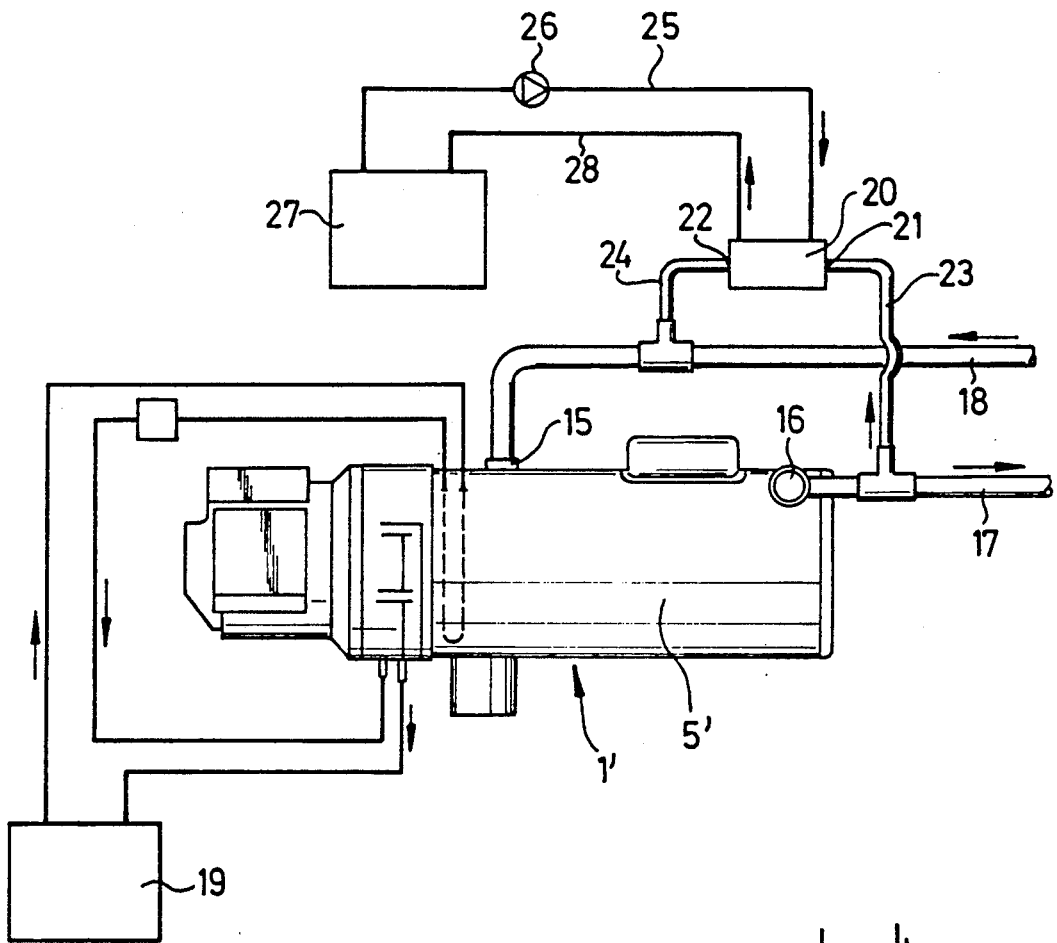
FIG. 4 is a diagrammatic view of a heater that is placed in a liquid coolant circuit of an internal combustion engine and, simultaneously, makes possible a preheating of the fuel to be fed to the internal combustion engine.

FIG. 4 diagrammatically shows a motor vehicle heater 1' integrated into a liquid coolant circuit of an internal combustion engine (only part of the circuit connecting to the heater being shown), and the coolant acts as the liquid heat exchange medium of a heat exchanger 5' of motor vehicle heater 1'. The liquid coolant of the internal combustion engine coolant circuit enters heat exchanger 5' by an intake 15 and leaves it by a discharge 16. As indicated by an arrow, the cooling liquid goes to intake 15 of motor Vehicle heater 1', and discharge 16 of heat exchanger 5' is connected to a return pipe 17 which goes, for example, to the internal combustion engine or other devices of the internal combustion engine coolant circuit.

The feed pipe coming from the internal combustion engine coolant circuit and connected to intake 15 is designated in FIG. 4 by 18. The fuel supply of the burner of motor vehicle heater 1', including fuel preheating pipe section 10, 10', is represented here only diagrammatically and it coincides with the examples explained above based on FIGS. 1 and 2. The supply container (e.g. fuel tank) provided for the fuel supply of motor vehicle heater 1' is shown diagrammatically by 19.

In this motor vehicle heater, designated overall by 1', which is a so-called water heater, a second heat exchanger 20 is placed in a parallel flow relationship relative to motor vehicle heater 1'. For this purpose, a feed branch pipe 23 is branched from coolant return pipe 17 downstream from discharge outlet 16 of heat exchanger 5'. Pipe section 23 is connected with intake 21 of heat exchanger 20. Discharge 22 of heat exchanger 20 is connected by a return branch pipe section 24 to the coolant feed pipe 18 leading to intake 15 of heat exchanger 5'. In the second heat exchanger 20, the coolant conveyed through it enters into a heat exchange relationship with the fuel which is being fed to the fuel supply device of the internal combustion engine.

The fuel supply device of the internal combustion engine is not, itself, shown gut, in the illustrated example, a fuel flow pipe of the fuel supply device is shown diagrammatically by 25, a pipe in which a fuel feed pump 26 is placed. The fuel removed from a supply container 27 of the fuel supply device of the internal combustion engine by pump 26 is supplied by fuel flow pipe 25 through the second heat exchanger 20, where it is warmed with the help of the liquid coolant that has been warmed by motor vehicle heater 1'. The fuel heated this way is fed back to supply container 27 by a return pipe 28. However, this design can be modified so that heat exchanger 20 is connected to only fuel flow pipe 25, so that the fuel which is preheated flows on from heat exchanger 20 to the sensitive filter devices of the fuel supply device of the internal combustion engine, and ultimately to the engine cylinders.

The embodiment shown in FIG. 4, thus, results in the fuel to be fed to the internal combustion engine being preheated using the liquid coolant warmed by motor vehicle heater 1', so that a reliable supply of fuel to the internal combustion engine is possible even at low temperatures.

Figure 5:
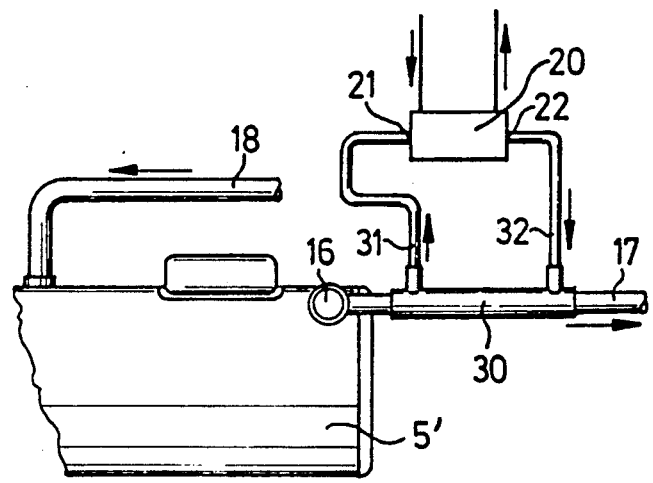
FIG. 5 is a diagrammatic view of a modified form of the embodiment according to FIG. 4 in which a connecting part is used to create a heat exchange loop for engine fuel preheating.

According to FIG. 5, for connection and parallel placement of second heat exchanger 20, a connecting part 30 is used that is placed between discharge outlet 16 of heat exchanger 5' and the Coolant return pipe 17 leading to the internal combustion engine. This connecting part 30 has a feed branch pipe 31 that is connected to the intake of the second heat exchanger 20. Further, a return branch pipe 32 is connected to discharge 22 of heat exchanger 20 which delivers the coolant back empties into connecting part 30. Such a connecting part 30 can simplify the installation of the second heat exchanger 20, since this connecting part 30 can be installed into the vehicle coolant circuit along with motor vehicle heater 1'.

We claim:

1. Auxiliary heating device for a motor vehicle, with a burner that is connected to a fuel flow pipe containing a fuel filter for fuel supply to the burner and to a fuel return pipe for removal of excess fuel, and with a counterflow heat exchanger in surrounding relationship to a combustion chamber for transferring heat from hot combustion gases generated during combustion of the fuel supplied to a heat exchange medium flowing through the heat exchanger as the gases flow in a direction from an outlet end of the combustion chamber toward the burner, said heat exchanger having an exhaust gas collection chamber disposed in proximity to said burner at a downstream end of the heat exchanger in a direction of gas flow therethrough at an inlet end of the combustion chamber, and an exhaust gas discharge outlet through which the combustion gases, after passage through the heat exchanger, exit the heating device; wherein said fuel flow pipe has a fuel preheating pipe section which is disposed in a turbulent region of the flow of the combustion gases through the heat exchanger in an area of said exhaust gas collection chamber as a means for warming the fuel in the fuel flow pipe at a location upstream of the filter in a direction of fuel flow to the burner.

2. Fuel preheating device according to claim 1, wherein the fuel preheating pipe section comprises a spirally running pipe coil having at least one coil winding.

3. Fuel preheating device according to claim 2, wherein the fuel preheating pipe section is coiled around the heat exchanger.

4. Fuel preheating device according to claim 3, wherein the fuel preheating pipe section is placed in said exhaust gas collecting chamber upstream from the exhaust gas discharge outlet in the direction of flow of the combustion gases to the exhaust gas discharge outlet.

5. Fuel preheating device according to claim 4, wherein the fuel preheating pipe section is located in proximity to an outside wall of the exhaust gas collecting chamber, so that the combustion gases flowing through the collecting chamber to the exhaust gas discharge outlet are impeded as little as possible.

6. Fuel preheating device according to claim 2, wherein the fuel preheating pipe section is disposed within said exhaust gas discharge outlet.

7. Fuel preheating device according to claim 6, wherein the fuel preheating pipe section is recessed into an inner wall surface of said exhaust gas discharge outlet.

8. Fuel preheating device according to claim 6, wherein the fuel preheating pipe section consists of a corrosion-resistant and heat-resistant material.

9. Fuel preheating device according to claim 1, wherein the heater is connected to the coolant circuit of an internal combustion engine by a coolant feed pipe and a coolant return pipe as a means for utilizing liquid coolant in the coolant circuit of the internal combustion engine as the heat exchange medium in the heater; wherein a second heat exchanger is connected in a pipe section leading from the coolant return pipe to the coolant feed pipe in proximity to the heater; and wherein a section of a fuel line section, by which fuel is fed to the internal combustion engine, is in heat exchange relationship with the liquid coolant leaving the heater in said second heat exchanger.

10. Fuel preheating device according to claim 1, wherein the heater is connected to the coolant circuit of an internal combustion engine by a coolant feed pipe and a coolant return pipe as a means for utilizing liquid coolant in the coolant circuit of the internal combustion engine as the heat exchange medium in the heater; wherein a second heat exchanger is connected in a pipe section leading from the coolant return pipe to the coolant feed pipe in proximity to the heater; and wherein a section of a fuel line section, by which fuel is fed to the internal combustion engine, is in heat exchange relationship with the liquid coolant leaving the heater in said second heat exchanger.

11. Fuel preheating device according to claim 10, wherein the fuel preheating pipe section is in said exhaust gas collecting chamber upstream from the exhaust gas discharge outlet in the direction of flow of the combustion gases to the exhaust gas discharge outlet.

12. Fuel preheating device according to claim 11, wherein the fuel preheating pipe section is located in proximity to an outside wall of the exhaust gas collecting chamber, so that the combustion gases flowing through the collecting chamber to the exhaust gas discharge outlet are impeded as little as possible.

13. Fuel preheating device according to claim 12, wherein the fuel preheating pipe section is disposed within said exhaust gas discharge outlet.

14. Fuel preheating device according to claim 1, wherein the fuel preheating pipe section is disposed within said exhaust gas discharge outlet.

15. Auxiliary heating device for a motor vehicle, with a burner that is connected to a fuel flow pipe containing a fuel filter for fuel supply to the burner and to a fuel return pipe for removal of excess fuel, and with a heat exchanger for transferring heat from hot combustion gases generated during combustion of the fuel supplied to a heat exchange medium flowing through the heat exchanger, said heat exchanger having an exhaust gas collection chamber disposed in proximity to said burner at a downstream end of the heat exchanger in a direction of gas flow therethrough, and an exhaust gas discharge outlet through which the combustion gases, after passage through the heat exchanger, exit the heating device; wherein said fuel flow pipe has a fuel preheating pipe section which is disposed in a turbulent region of the flow of the combustion gases through the heat exchanger in an area of said exhaust gas collection chamber as a means for warming the fuel in the fuel flow pipe at a location upstream of the filter in a direction of fuel flow to the burner; wherein the heater is connected to the coolant circuit of an internal combustion engine by a coolant feed pipe and a coolant return pipe as a means for utilizing liquid coolant in the coolant circuit of the internal combustion engine as the heat exchange medium in the heating device; wherein a connecting part is disposed between the coolant return pipe and a coolant discharge outlet of the heat exchanger of the heating device, said connecting part having a feed branch pipe and a return branch pipe; and wherein a portion of a fuel line section, by which fuel is fed to the internal combustion engine, is in heat exchange relationship with the liquid coolant leaving the heating device in said second heat exchanger.

16. Fuel preheating device according to claim 15, wherein the fuel preheating pipe section is placed in said exhaust gas collecting chamber upstream from the exhaust gas discharge outlet in the direction of flow of the combustion gases to the exhaust gas discharge outlet.

17. Fuel preheating device according to claim 16, wherein the fuel preheating pipe section is located in proximity to an outside wall of the exhaust gas collecting chamber, so that the combustion gases flowing through the collecting chamber to the exhaust gas discharge outlet are impeded as little as possible.

18. Fuel preheating device according to claim 15, wherein the fuel preheating pipe section is disposed within said exhaust gas discharge outlet.

19. Fuel preheating device according to claim 18, wherein the fuel preheating pipe section is recessed into an inner wall surface of said exhaust gas discharge outlet.

20. Fuel preheating device according to claim 16, wherein the fuel preheating pipe section consists of a corrosion-resistant and heat-resistant material.

* * * * *